United States Patent [19]
Anderson

[11] Patent Number: 5,176,059
[45] Date of Patent: Jan. 5, 1993

[54] SCROLL SAW HOLD DOWN APPARATUS PROVIDING ENHANCED WORK PIECE CLEARANCE

[75] Inventor: Robert C. Anderson, Arlington Heights, Ill.

[73] Assignee: Skil Corporation, Chicago, Ill.

[21] Appl. No.: 743,452

[22] Filed: Aug. 9, 1991

[51] Int. Cl.$^5$ .............................................. B27B 11/10
[52] U.S. Cl. ...................................... 83/462; 83/465; 83/466; 83/783
[58] Field of Search ................ 83/452, 462, 465, 466, 83/783-786; 144/242 B; 269/254 R, 203

[56] References Cited

U.S. PATENT DOCUMENTS

| | | | |
|---|---|---|---|
| 189,461 | 4/1877 | House | 83/786 |
| 226,130 | 3/1880 | Sutton | 144/242 B |
| 1,877,705 | 9/1932 | Tautz | 83/784 |
| 2,094,996 | 10/1937 | Löwenstein et al. | 144/242 B |
| 2,347,918 | 5/1944 | Lethenstrom | 144/242.8 |
| 2,646,089 | 7/1953 | Gaskell | 83/784 |
| 2,663,331 | 12/1953 | Herder | 144/242 B |

FOREIGN PATENT DOCUMENTS 0411927  6/1934  United Kingdom ................ 83/786

Primary Examiner—Frank T. Yost
Assistant Examiner—Allan M. Schrock
Attorney, Agent, or Firm—Jones, Day, Reavis & Pogue

[57] ABSTRACT

Precision saws such as scroll saws and the like are provided with a hold down apparatus which allows for enhanced work piece clearance thus, greater work piece thickness utilization of the saws wherein the hold down apparatus is mounted in an offset position allowing the hold down to be raised to a maximum height to just below reciprocating saw blade drive means. A work piece hold down apparatus for use in combination with a work piece table and a saw blade having a reciprocating drive means is provided wherein a work piece hold down apparatus having a hold down foot which is generally planar with forwardly projecting spaced apart arms for engaging the work piece on each side of the blade, the foot planar portion being connected to a rod member on a second planar portion of the hold down apparatus with the rod member being affixed to the hold down apparatus offset from the generally planar foot portion and adjustably mounted by clamping means to a saw frame member behind and adjacent to the reciprocating saw blade.

11 Claims, 2 Drawing Sheets

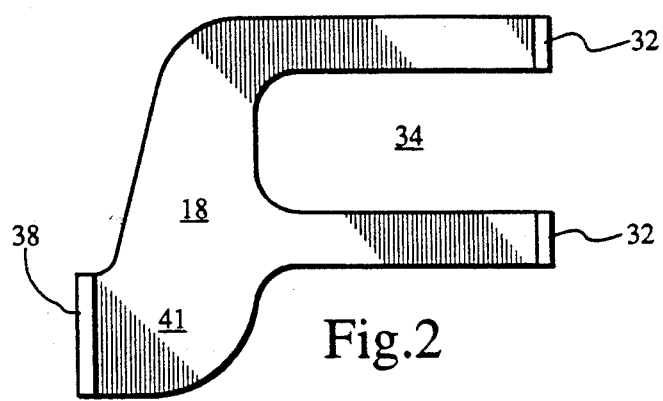
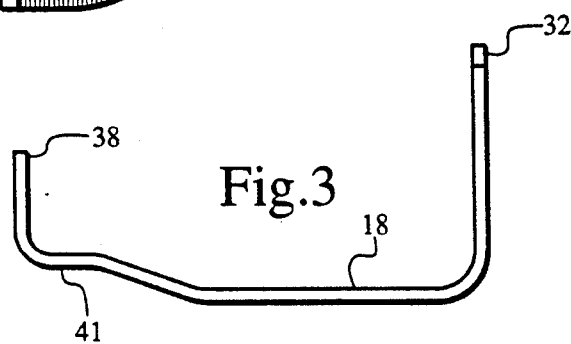
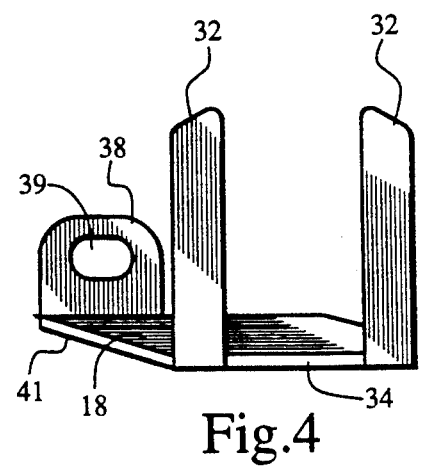
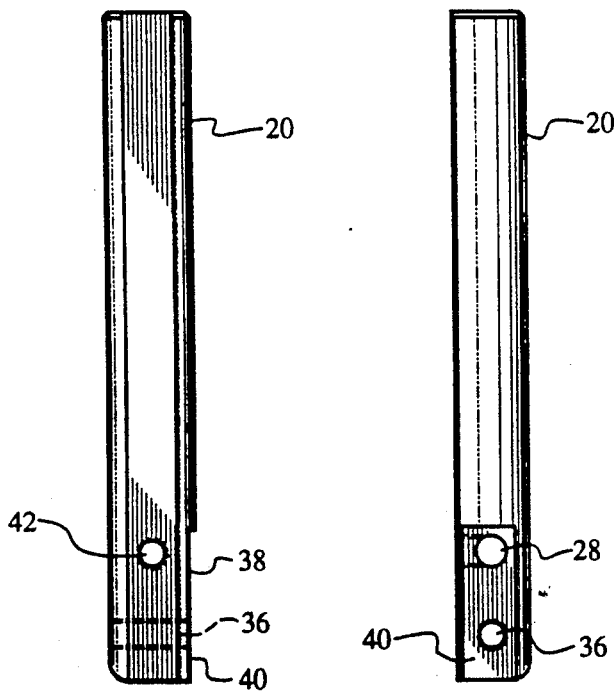

SCROLL SAW HOLD DOWN APPARATUS PROVIDING ENHANCED WORK PIECE CLEARANCE

FIELD OF THE INVENTION

The present invention relates to a work piece hold down apparatus for use with scroll saws having reciprocating blades. The invention relates generally to precision saws and more particularly to a device for holding a work piece on the working surface of such a saw wherein the hold down apparatus is mounted in an offset position which allows greater work piece clearance or thickness between the hold down apparatus and the working surface.

BACKGROUND OF THE INVENTION

Precision saws or scroll saws are utilized for cutting detailed fret work and other intricate patterns in wood, plaster, and other materials. The saws typically employ parallel arms which hold a fine thin blade between said arms, the arms moved in tandem so as to affect the cutting action of the blade. The parallel arms or beams are pivotally mounted on trunnions which in turn are journaled to bearings carried by the frame of the scroll saw. At the opposite end of the beams, an adjustable bolt and spring is provided so as to maintain the blade under tension. A motor or other drive system is connected to one of the beams so as to reciprocate the beams in an up and down fashion on their trunnions such that the saw blade reciprocates in a generally vertical blade plane relative to the work piece for cutting purposes. Such scroll saws may be utilized to make both straight line and curved cuts in rather intricate patterns and shapes in a variety of sheet like materials including wood, metal, plastic and the like. Generally the teeth of the blade are so shaped such that the blade cuts only on the down stroke.

It is well known to provide a work piece hold down which partially surrounds the blade having as a primary function the hold down of the work piece being cut on the table during the upward stroke of the moving blade. The work piece hold down also offers some protection for the fingers and hands of the operator during the cutting action.

Developments in material sciences have created work piece materials of various densities, sawability and the like, thus the desire to precision saw thicker work pieces. Generally, the work piece hold down scroll saw apparatus provides a restricted clearance between the maximum elevation of the hold down position and the saw table. For example, hold down apparatus is frequently mounted behind the saw blade with a mounting head which is attached to an angled support rod. The rod frequently is passed under the saw head in order to align the mounting means of the hold down member behind the saw blade. Such cumbersome mounting apparatus limits the maximum clearance that can be achieved between the hold down member and the saw table, i.e., limiting the maximum thickness of a work piece which can be detail sawed by the scroll saw.

Improved performance of process machinery which provides maximum capacity either in size and/or volume is a common incentive for improvement. In other words, the best way to improve production and flow or production capability is to use processing machinery which provides high compatibility and versatility. The selection of the right machine according to the material to be processed to perform specific processing has great importance with respect to the level of utilization of the apparatus. For example, when acrylic or wooden materials are shaped by means of a regular scroll sawing machine, if the material is changed, the blade or even the whole set of the machine members must be changed accordingly because of various speed, motor requirement and/or work piece thickness. To change heads in an apparatus is very time consuming and the alternative is a non-economical approach of preparing a complete series of scroll sawing machines for different work piece dimensions and materials.

Additionally, many scroll saws are designed such that the work table is pivotally moveable with respect to the frame so as to permit bevel cuts in the work piece by inclining the work table and the work piece supported thereby relative to the vertical plane of the blade. Such beveled sawing on a pivoted work table further reduces the potential thickness of the work piece to be accommodated. If the work piece is too thick causing the stock to contact the hold down arm or mounting member, the complete hold down assembly must be removed which also removes a degree of precision in working with the work piece. In another aspect, the removal of hold down assembly because of limited work piece thickness accommodation poses safety problems through the removal of the hold down guard fingers.

The present invention overcomes the deficiencies of the prior art by providing a work piece hold down apparatus which allows maximum clearance between the hold down apparatus and the saw table through an offset hold down mounting support rod which is clamped to the saw frame member. The apparatus allows for maximum elevation of the work piece hold down and guard fingers in relationship to the saw table thus providing functionality of the scroll saw for enhanced work piece thickness.

SUMMARY OF THE INVENTION

Among the several objects and features of the present invention will be noted, included is the provision of a readily adjustable work piece hold down which permits thicker work pieces to be sawed by a scroll saw because of a greater adjustment gap between the work piece hold down and saw table. This enhanced clearance which allows for thicker work pieces is achieved through a work piece hold down apparatus mounting means which allows the work piece hold down foot to be elevated to a position just below the reciprocating saw upper fixed arm lower position. Such clearance is through an offset mounting means and rod which is adjustably clamped to the frame member thus allowing the work piece hold down foot to be elevated to a maximum position without interference due to the suspension and hold down mounting means. A first planar portion of the work piece hold down foot engages the work piece behind the blade and is integral with forwardly projecting spaced apart arms and guard fingers which engage the work piece on the sides and in front of the blade. A second planar portion is spaced above from the first planar portion in an offset. The offset portion is adapted to secure the foot to a stationary arm of the saw by a mounting rod member which is adjacent and parallel to the saw.

In general a reciprocating saw assembly having an enhanced work piece thickness capacity between a work piece hold down and saw table is presented wherein a saw frame having upper and lower arm members provide for mounting and drive means for a reciprocating saw which reciprocates between the saw frame arm members. A work piece hold down apparatus which is adjustably mounted in a spaced relationship to the saw work table by a clamping means mounted on the upper saw frame member adjacent to the upper saw blade drive arm is provided which allows for maximum spacing of the work piece hold down apparatus and the saw table. The work piece hold down apparatus is supported by a rod member clamped at a first end to the upper frame member with the rod member being affixed to the hold down foot at a plane slightly elevated to the plane of the foot, behind and offset from the saw plane. The hold down foot of generally planar proportions for engaging the work piece behind the blade provides forwardly projecting spaced apart arms for engaging the work piece on each side of the blade with the arms terminating in upturned protection guard fingers.

The work piece hold down apparatus through a frame adjustably mounted support rod which is offset and behind the saw blade allows for the work piece hold down apparatus to function in holding greater thickness work pieces through a greater degree of adjustability of the supporting rod on the frame member mounting means, thus allowing travel of the work piece hold down foot to a position just below the lowest reciprocating saw position. The work piece hold down foot has an elevated mounting face which is mounted into a slot on the rod member which provides an offset mount to the bulk of the work piece hold down foot. The rod member being adjustably mounted to the saw frame through one clamping means is readily adjusted thus creating an ease of operation for the work piece hold down apparatus through one single adjustment which is adjacent to but behind the saw blade. The invention relates to a scroll saw, however, any reciprocating saw apparatus utilizing a work table and a work piece hold down apparatus would benefit from the improvement of the invention.

Specifically the improvement of this invention relates to a means for adjusting the work piece hold down elevation in relationship to the saw table in order to allow a maximum work piece thickness utilization of the apparatus, said adjustment being through a single supporting rod member mounted to the upper frame and supporting the work piece hold down foot in an offset so that the movement of the foot is unencumbered or unobstructed by any apparatus to a point just below the lowest reciprocating saw blade mounting head travel.

BRIEF DESCRIPTION OF THE DRAWINGS

These and other objects of the present invention will be more fully understood in conjunction with the accompanying drawings in which like numbers indicate like components and in which:

The FIG. 1 is a prospective view of a scroll saw incorporating the work piece hold down apparatus adjustment assembly of the present invention;

FIG. 2 is a top plane view of the work piece hold down foot;

FIG. 3 is a side elevational view of the work piece hold down foot;

FIG. 4 is a front elevational view of the work piece hold down foot;

FIG. 5 is a side elevational view of the work piece hold down support rod;

FIG. 6 is a front elevational view of the work piece hold down support rod; and

FIG. 7 is an end view of the work piece hold down support rod.

Corresponding reference characters indicate corresponding parts throughout the several views of the drawings.

DETAILED DESCRIPTION OF THE DRAWINGS

Figure 1:
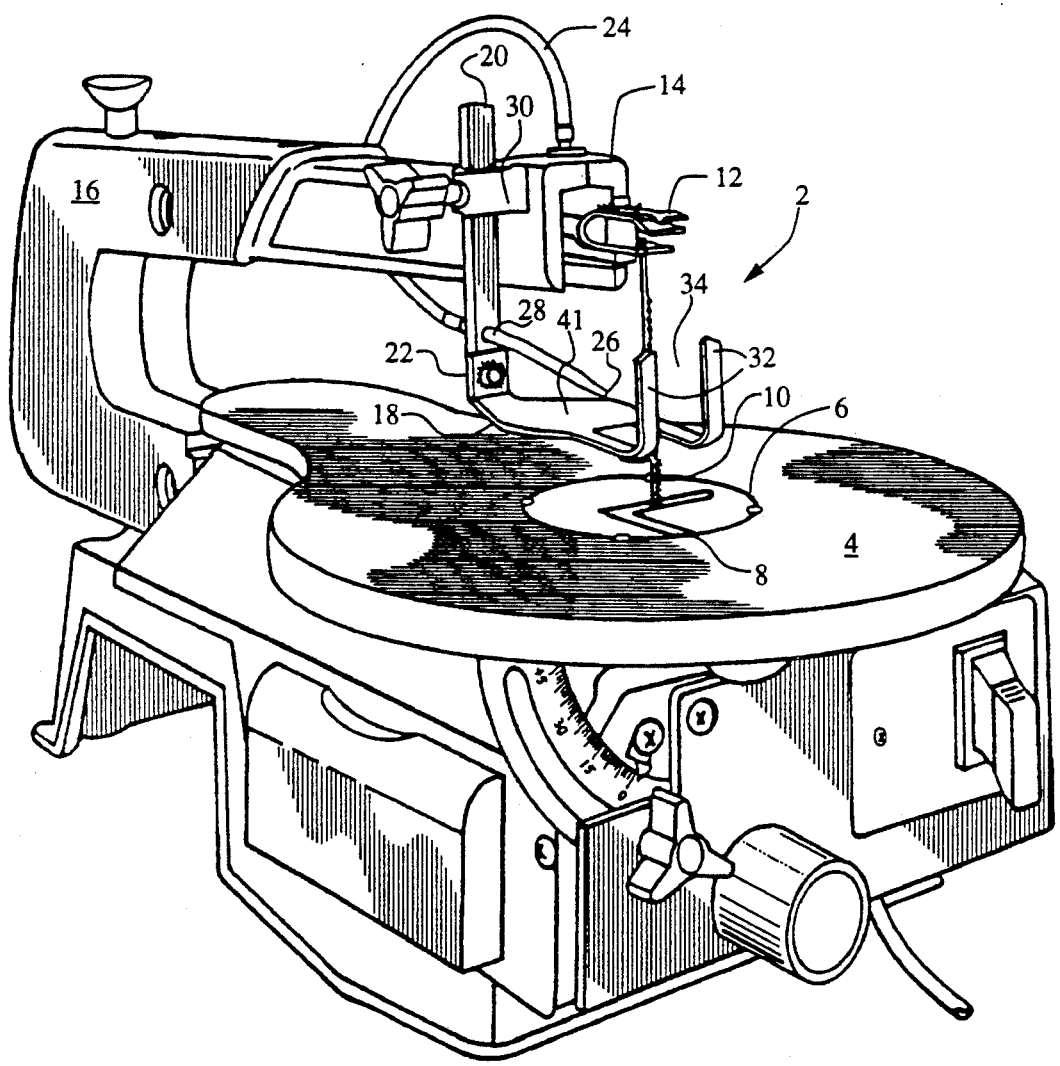

Referring now to the drawings, a motorized scroll saw is indicated in its entirety by reference character 2. The scroll saw is shown with typical base, adjustments and switches which are not characterized by reference numerals. However, the scroll saw 2 of FIG. 1 provides figure characterization of multiple elements starting with table 4. Table 4 which is utilized to support work pieces has a table insert 6 through which saw blade receiving channel 8 provides a passageway for the reciprocating saw blade 10. The reciprocating saw blade 10 is fixed to an upper drive arm 12 mounted in an upper frame housing 14. The saw apparatus is provided with a housing support 16 which connects in a U-shaped manner the upper saw blade drive arm housing and a lower support for the table and saw blade drive arm which is not shown.

An offset hold down foot 18 of a general planar configuration is mounted through an offset projection of the holding foot 18 to a lower portion of a hold down support rod 20. The hold down support rod 20 provides for a hold down rod, foot connection 22. The foot connection 22 is elevated from the general plane of hold down foot 18 and vertical to the plane of the hold down foot 18 for fixing to a flat portion of the hold down support rod 20 lower end. The hold down support rod 20 provides for an opening 28 for supporting an air nozzle 26 which is connected to an air source tube 24.

An upper hold down support rod positioning clamp 30 is provided affixed to the upper drive arm housing 14 in an adjustable manner for raising and lowering the hold down foot 18. Such adjustment is simply achieved by loosening the clamp means 30 for direct raising and lowering of hold down support rod 20 and the affixed hold down foot 18. The offset position of the hold down support rod positioning clamp 30 allows for maximum elevation of the hold down foot 18 in relationship to the saw blade upper drive arm 12, thus providing a maximum work piece thickness clearance between the hold down 18 and table 4.

The hold down foot 18 forwardly projects arms on both sides of the reciprocating saw blade 10 creating a blade channel 34. The forwardly projecting hold down foot arms terminate in upturned guard fingers 32.

The offset magnitude of hold down foot 18 in relationship to the blade channel 34 and hold down foot mounting face 38 are more clearly presented in the top plan view of FIG. 2. The hold down mounting face 38 of foot 18 through a connecting portion 41 is offset to an extent that the mounting face 38 is positioned substantially to the side of the functioning hold down foot planar member 18. The side elevational view of FIG. 3 presents the mounting face at a raised planar relationship to the plane of foot 18 connected by connection portion 41. The view further provides substantially perpendicular guard fingers 32 in relationship to the plane of the hold down foot 18.

FIG. 4 presents an elevated end view with the guard fingers 32 projected forward of the hold down foot 18 and to either side of the blade channel 34. The figure presents the mounting face 38 with a mounting face opening 39 for mounting to the support rod 20 through offset hold down mounting pin hole 36 of hold down support rod 20. FIGS. 5, 6 and 7 present various views of the hold down support rod 20 with FIG. 5 presenting the support rod in a side elevational view showing the mounting face 38 and mounting face groove 40 with hold down mounting pin hole 36. An air tube set screw or tensioning adjustment opening 42 is provided for maintaining air nozzle 26 in appropriate position in relationship to the reciprocating saw blade 10 and hold down foot 18. The front view of FIG. 6 again presents the mounting face 38 flat portion 40 with hold down mounting pin hole 36 as well as air tube holder opening 28. An end view of the hold down support rod 20 is presented in FIG. 7 which further illustrates the mounting face 38 mounting flat 40.

The work piece hold down apparatus in accordance with the invention can also be utilized with walking beam scroll saws wherein an independent mounting support means is extended from the saw frame housing in order to accommodate clamping mounting of the rod member and hold down. A walking beam scroll saw is not shown in the drawings nor is a pivotally mounting means of the hold down foot to the rod member. Both of these adaptations are considered to be either an element of the invention or apparatus which can be modified by the invention for purposes of providing enhanced work piece clearance.

In conclusion, the present invention provides a scroll sawing apparatus or related reciprocating saw blade apparatus utilizing hold down, work table elements which includes an offset positioning device for providing a work piece hold down apparatus capable of providing maximum clearance between the hold down foot and table surface for work piece thickness. Said spacing is allowed by a simple offset adjustably mounted work piece hold down foot and support rod apparatus. As other changes could be made from the above constructions without departing from the scope of the invention, it is intended that all matter contained in the above description or shown in the accompanying drawings shall be interpreted as illustrative and not in a limiting sense.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A reciprocating saw assembly having an enhanced work piece thickness capacity between a work piece hold down apparatus and a saw table comprising:
   a saw frame having upper and lower arm members;
   a saw blade fixed at opposite ends within a reciprocating drive assembly for reciprocating motion between the saw frame arm members;
   a work piece hold down apparatus adjustably mounted in a spaced relationship to the work table;
   a rod member for supporting the work piece hold down apparatus;
   means for clamping the rod member at a first end portion to the upper frame member, said rod member being offset with respect to the reciprocating saw and extending downwardly;
   a hold down foot of first generally planar proportions pivotally mounted to said rod member at a second end portion for engaging the work piece substantially behind the saw blade;
   spaced apart arms forwardly projecting from said foot parallel to the cutting plane of the saw blade for engaging the work piece on each side of the saw blade; and
   upturned protection guard fingers integrally formed with and terminating at a 90° angle with said arms.

2. A reciprocating saw assembly having an enhanced work piece thickness capacity according to claim 1 wherein the rod member extends downward in a plane which is substantially parallel to the plane of the reciprocating saw.

3. A reciprocating saw assembly having an enhanced work piece thickness capacity according to claim 1 and further comprising:
   a hold down foot mounting face groove on the rod member second end portion; and
   a mounting bore in said mounting face for pivotally mounting the hold down foot in a fixed position which is substantially parallel to the plane of the work piece.

4. A reciprocating saw assembly having an enhanced work piece thickness capacity according to claim 1 wherein the hold down foot further comprises:
   a single unitary structure inclusive of the hold down foot having said first generally planar portion; and
   a mounting face which is offset and on a second raised planar portion with a connection portion between the two planar portions, said mounting face being substantially perpendicular to said first and second planar portions.

5. A reciprocating saw assembly having an enhanced work piece thickness capacity according to claim 1 further including means for raising the work piece hold down foot to a position just below the upper fixed saw blade drive assembly at the drive assembly's lowest reciprocating position wherein the maximum spacing between the work piece hold down foot and saw table is achieved.

6. A work piece hold down apparatus for use in combination with a work piece table and a saw having a reciprocating blade and comprising:
   a first planar portion in a plane parallel to and engaging the work piece substantially behind the reciprocating saw, said planar portion having forwardly projecting spaced apart arms for engaging the work piece on each side of and parallel to the cutting plane of the blade, said arms terminating in upturned projecting guard fingers;
   a rod member having an upper end and a lower end;
   a second planar portion of the hold down apparatus parallel to and connecting said first planar portion to said rod member at the lower end thereof, said second planar member being substantially offset and affixed to an end portion of the rod member;
   means for adjustably mounting the rod member at the upper end to a saw frame behind and adjacent to the reciprocating saw blade by clamping means; and
   a rod member mounting face integrally formed with and perpendicular to said second planar portion for pivotally attaching said hold down apparatus to said rod member so as to enable said hold down apparatus first planar portion to remain parallel to said work piece when said work piece table is tilted.

7. A work piece hold down apparatus according to claim 6 wherein the rod member is offset to and extends downwardly from the saw frame in a plane which is substantially parallel to the plane of the reciprocating saw blade.

8. A work piece hold down apparatus according to claim 6 wherein the first planar portion, second planar portion and said rod member mounting face comprise an integrally formed single member hold down apparatus.

9. A work piece hold down apparatus according to claim 6 further comprising means for pivotally mounting the hold down apparatus in an offset manner to an end portion of the rod member to enable said hold down apparatus to be adjusted parallel to the work piece when the work piece table is tiled.

10. A work piece hold down apparatus according to claim 9 further comprising means for offset mounting the rod member and work piece hold down apparatus on an opposite side of the saw reciprocating blade from the upward tilting table which generally tilts up to about 45° to enable said pivotally attached hold down apparatus to be positioned parallel to the work piece when the work piece table is tilted thereby providing enhanced work piece thickness capacity for bevelled cuts.

11. A walking beam scroll saw assembly having an enhanced work piece thickness capacity between a work piece hold down apparatus and a saw table, comprising:

a saw frame having upper and lower arm members;

a saw blade fixed at opposite ends within a reciprocating drive assembly;

a work piece hold down apparatus adjustably mounted in a spaced relationship to a work table;

a rod member clamped at a first end portion to the upper saw frame extension member and supporting the work piece hold down apparatus, said rod member being offset to the reciprocating saw and extending downwardly;

a hold down foot of generally planar portion being mounted at a second end portion of said rod member for engaging the work piece substantially behind the blade;

forwardly projecting spaced apart arms extending from said foot parallel to the cutting plane of the blade for engaging the work piece on each side of the blade; and upturned protection guard fingers terminating said arms.

* * * * *